(12) United States Patent
Hermes et al.

(10) Patent No.: US 7,645,815 B2
(45) Date of Patent: Jan. 12, 2010

(54) FAST-DRYING AQUEOUS COMPOSITIONS WITH HOLLOW PARTICLE BINDERS AND TRAFFIC PAINTS MADE THEREWITH

(75) Inventors: Ann R. Hermes, Ambler, PA (US); Francis J. Landy, Jenkintown, PA (US); Mary Anne R. Matthews, Willow Grove, PA (US); Donald C. Schall, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 208 days.

(21) Appl. No.: 12/008,003

(22) Filed: Jan. 8, 2008

(65) Prior Publication Data

US 2008/0171810 A1    Jul. 17, 2008

Related U.S. Application Data

(60) Provisional application No. 60/880,635, filed on Jan. 16, 2007.

(51) Int. Cl.
*F21V 7/22* (2006.01)
(52) U.S. Cl. ........................... 523/172; 523/218
(58) Field of Classification Search ................. 523/172, 523/218
See application file for complete search history.

(56) References Cited

U.S. PATENT DOCUMENTS

| | | | |
|---|---|---|---|
| 4,970,241 A | 11/1990 | Kowalski et al. | |
| 4,985,064 A | 1/1991 | Redlich et al. | |
| 6,413,011 B1 | 7/2002 | Sobczak et al. | |
| 6,689,824 B2 | 2/2004 | Friel et al. | |
| 2003/0224184 A1 | 12/2003 | Hermes et al. | |
| 2005/0032933 A1 | 2/2005 | Hermes et al. | |

FOREIGN PATENT DOCUMENTS

| | | |
|---|---|---|
| EP | 0 409 459 A2 | 1/1991 |
| EP | 1240 950 A2 | 9/2002 |
| JP | 2004-263001 A | 9/2004 |
| WO | WO 00/68304 | 11/2000 |
| WO | WO 00/68310 | 11/2000 |

*Primary Examiner*—Edward J Cain
(74) *Attorney, Agent, or Firm*—Andrew E. C. Merriam

(57) ABSTRACT

The present invention provides fast-drying aqueous compositions that lower the cost of making roadway markings without impairing the quality or appearance of the markings made therewith. The aqueous compositions comprise one or more hollow core binder having an average particle size of from 200 to 500 nanometers (nm), preferably from 300 to 470 nm, and made of a first polymer having a glass transition temperature (Tg) of 50° C. or more and containing one or more void, the first polymer being substantially encapsulated by one or more second polymer having a Tg of −30° C. or more, preferably, −20° C. or more. Fast-drying aqueous compositions may be one component or two component compositions. One component compositions comprise one or more volatile base, one or more polyfunctional amine, and one or more hollow core binder with a second polymer chosen from, for example, an anionically stabilized emulsion polymer, a polyamine functional polymer, a polymer having strong pendant cationic groups containing and mixtures thereof. The polyfunctional amine can be part of the hollow core binder. Two component compositions comprise one or more aqueous hollow core binder and an absorber component. The present invention also provides coatings and roadway markings made from the fast-drying aqueous compositions.

10 Claims, No Drawings

FAST-DRYING AQUEOUS COMPOSITIONS WITH HOLLOW PARTICLE BINDERS AND TRAFFIC PAINTS MADE THEREWITH

This application claims the benefit of priority under 35 U.S.C. §119(e) of U.S. Provisional Patent Application No. 60/880,635 filed on Jan. 16, 2007.

The present invention relates to aqueous compositions for use in traffic paint, and to the roadway markings formed using such compositions. More particularly, the present invention relates to fast-drying one or more component aqueous dispersion compositions having improved stability that comprise hollow core binder particles having an average particle size of from 200 to 500 nm in which the hollow core binder has a glass transition temperature sufficient to provide good processibility, thereby enabling a lower cost approach to making roadway markings.

Traffic paints have previously been formulated with a high loading of titanium dioxide ($TiO_2$) to improve the opacity of roadway markings made with such paints. The high cost of $TiO_2$ thus presents a quandary to the local, state and federal government agencies charged with maintaining roadway markings to provide adequate demarcation of traffic lanes for safety's sake.

One approach to reducing the cost of providing roadway markings would be to replace all or part of $TiO_2$ with an opacifier that relies on voids or hollow spaces in the opacifier, for example, hollow core polymer pigments. For example, Japanese Patent Publication JP 2004-263001A, assigned to GANZ KASEI KK, discloses aqueous dispersion compositions comprising an aqueous dispersion of hollow core polymer pigment particles and road markings made with the compositions. Unfortunately, roadway markings made using the hollow polymer pigment particles as an opacifier exhibit cracking and poor film-forming performance in the marking.

The present inventors have endeavored to provide aqueous traffic paints that lower the cost of making roadway markings without impairing the quality or appearance of the markings made with such paints.

The present invention provides fast-drying aqueous compositions comprising one or more hollow core binder of a first polymer having a glass transition temperature (Tg) of 50° C. or more and containing one or more void, the first polymer being substantially encapsulated by one or more second polymer having a Tg of −30° C. or more, and the hollow core binder having an average particle size of from 200 to 500 nanometers (nm), the fast-drying aqueous composition being in one component or two components. One component fast-drying aqueous compositions comprise one or more volatile base in an amount sufficient to raise the pH of the fast-drying aqueous composition to 7.5 or more, and one or more hollow core binder with a second polymer chosen from an anionically stabilized emulsion polymer, a polyamine functional emulsion polymer containing pendant amine functionality, a hydrophobic polyamine functional emulsion polymer, a blend of an emulsion polymer having pendant strong cationic groups and an emulsion polymer having pendant weak acid groups, and mixtures thereof, wherein, when the second polymer of the hollow core binder is an anionically stabilized emulsion polymer, the composition further comprises polyfunctional amine. Two component fast-drying aqueous compositions comprise one or more aqueous hollow core binder and an absorber component. Preferably, the average particle size of the hollow core binder is 300 nm or more, or, more preferably, 320 nm or more.

One or both of the first and the second polymer may be formed from, as polymerized units, one or more ethylenically unsaturated monomer.

Preferably, the glass transition temperature (Tg) of the second polymer ranges from −20° C. to 60° C., or, more preferably, −10° C. or more.

The present invention also provides coatings and roadway markings and methods of making the same from the fast-drying aqueous compositions. The methods comprise applying the compositions to a substrate, including, for example, a road.

All ranges recited are inclusive and combinable. For example, average particle sizes that range 200 nanometers (nm) or more and that may range up to 500 nm, preferably up to 470 nm, more preferably, 300 nm or more or, more preferably, 320 nm or more would include average particle sizes of from 200 nm to 500 nm, or of from 300 to 500 nm, or of from 200 nm to 470 nm, or of from 300 nm to 470 nm, or of from 320 nm to 500 nm, or of from 320 nm to 470 nm.

Unless otherwise indicated, all temperature and pressure units are standard temperature and pressure (STP).

All phrases comprising parentheses denote either or both of the included parenthetical matter and its absence. For example, the phrase "(meth)acrylate" includes, in the alternative, acrylate and methacrylate; likewise, the phrase "(co) polymer" refers, in the alternative, to a polymer, a copolymer, a terpolymer, a tetrapolymer, a pentapolymer, etc.

As used herein, the term "average particle size" means the particle size as determined by CHDF (capillary hydrodynamic fractionation) using Matec CHDF-2000; Matec Applied Sciences, Northborough, Mass., or by light scattering (LS) using a BI-90 particle size analyzer, Brookhaven Instruments Corp. (Holtsville, N.Y.).

As used herein, the term "component" means a composition comprising the specified ingredient. For example, an absorber component may simply be an absorber or it may comprise an absorber and an aqueous polymer dispersion.

As used herein, the term "fast-drying aqueous composition" means that, when applied to a substrate, the composition forms a film having a dry through time such that a film thereof having a wet coating thickness of 330 microns displays a dry-through time of less than two hours at 90 percent relative humidity at 23° C. The term "fast-drying aqueous binder composition" refers to an aqueous polymer dispersion comprising one or more binder that, when applied to a substrate, forms a film having a dry-through time conforming to the definition of "fast-drying"; thus, one component fast-drying aqueous compositions comprise fast-drying aqueous hollow core binders. The term "two component fast-drying aqueous composition" refers to an aqueous polymer composition comprising one or more binder and an absorber component that when applied to a substrate, forms a film having a dry-through time conforming to the definition of "fast-drying".

As used herein, the term "(meth)acrylate" means acrylate, methacrylate, and mixtures thereof and the term "(meth) acrylic" used herein means acrylic, methacrylic, and mixtures thereof.

As used herein, unless otherwise indicated, the phrase "molecular weight" refers to the weight average molecular weight as measured by gel permeation chromatography (GPC) against a polyacrylic acid (PAA) standard of a copolymer that is hydrolyzed in KOH.

As used herein, the term "pigment volume concentration" or PVC refers to the quantity calculated by the following formula:

$$PVC\ (\%) = \frac{(\text{volume of pigment(s)} + \text{volume extender(s)}) \times 100}{\text{total dry volume of paint}}$$

As used herein, the term "road" includes any indoor or outdoor solid surface that is or may be constantly or intermittently traveled on by pedestrians, moving vehicles, tractors, or aircraft continuously. Some non-limiting examples of a "road" include highways, streets, driveways, sidewalks, runways, taxiing areas, tarmac areas, parking lots.

As used herein, unless otherwise indicated, the term "Tg" or "glass transition temperature" of a polymer refers to the Tg of a polymer calculated by using the Fox equation (T. G. Fox, Bull. Am. Physics Soc., Volume 1, Issue No. 3, page 123 (1956). The Tg of various homopolymers may be found, for example, in Polymer Handbook, edited by J. Brandrup and E. H. Immergut, Interscience Publishers. The "Experimental Tg" of a polymer is measured by differential scanning calorimetry (DSC) using the mid-point in the heat flow versus temperature transition as the Tg value. A typical heating rate for the DSC measurement is 20° C./minute.

As used herein, the term "substantially encapsulating" means that greater than 50% of the surface area of the encapsulated particle, e.g. (co)polymer, is covered by the encapsulant, e.g. first or second polymer.

As used herein, the term "void" refers to a polymer-free space, which may be filled with air or another gas when the substance containing it is dry.

As used herein, the term "volatile organic compound" (VOC) is defined as a carbon-containing compound that has a boiling point below 280° C. at atmospheric pressure.

As used herein, the phrase "wt. %" stands for weight percent.

Hollow core binder polymer binder particles have one or more hollow core or void and reduce the mass of the particles, thereby reducing the mass of materials used in fast-drying aqueous compositions, such as traffic paints, and allowing applicators to apply more roadway markings with a given mass of paint. Further, hollow core binders contribute to the opacity of dry coating films, thereby allowing for reduction of titanium dioxide or opacifying pigments in coating compositions. In fact, coating compositions comprising the hollow core binder of the present invention provide coatings and films with film integrity and opacity properties comparable to coatings having up to 30 wt. % more of each of costly opacifier pigment or $TiO_2$ and binder polymer added thereto. Accordingly, coating formulations comprising the inventive polymer particles as binders may provide opacity, brightness and film integrity equal to formulations comprising higher proportions of binder as non-voided polymer particles and higher proportions of opacifiers. Thus, a formulator may achieve a desired level of opacity in coating formulations using the hollow core binder of the present invention by using a lower level of pigment and/or extender than would be required to achieve the same level of opacity in a comparable formulation using non-voided polymer particles as binder.

The fast-drying aqueous compositions of the present invention comprise hollow core binders having one or more non-film forming first polymer containing one or more void, the first polymer having a glass transition temperature sufficient to provide in process durability and being substantially encapsulated by one or more film-forming second polymer, wherein the second polymer has a glass transition temperature (Tg) ranging from −30° C. or more, and ranging up to and including 60° C., preferably, −20° C. or more. Preferably, greater than 75%, and more preferably 100%, of the surface area of the first polymer particle is covered by the second polymer. To insure that the second polymer substantially encapsulates the first polymer and to insure that the hollow core binder behaves as a binder, the weight ratio of second polymer to the first polymer in the hollow core binder of the present invention ranges from 1:1 to 4:1. Preferably, the weight ratio of second polymer to the first polymer ranges from 1.5:1 to 3:1. The extent of coverage or encapsulation of the polymeric particles may be determined by scanning electron microscopy, with or without staining techniques, as is known in the art.

In the hollow core binder, each of the first polymer and second polymer may, independently, comprise a single stage (co)polymer or a multi-stage copolymer having two or more stages. Preferably, the first polymer comprises a multi-stage copolymer.

When the first polymer comprises a multi-stage copolymer having a core, the core polymer or stage may comprise, as polymerized units, any one or more (co)polymer in which one or more hollow or void may be formed in the polymer by known methods, such as alkali swelling. Alternatively, the one or more void or hollow in the first polymer, whether a single stage polymer or a multi-stage (co)polymer, may be formed by known methods, such as the removal of porogens, void-forming dissolution in organic solvent, or by use of blowing agents.

The compositions of the first polymer and the second polymer are selected so as to provide good processability so as to enable the formation of fast-drying aqueous compositions that provide coatings and films with desirable opacity and durability. Each of the first polymer and second polymer of the hollow core binder may, independently, comprise the polymerization product of one or more ethylenically unsaturated monomer, preferably one or more mono-ethylenically unsaturated monomer. Each of the first polymer and the second polymer may be a condensation polymer, such as a polyester, polyurethane, polyamide or alkyd.

Suitable first polymers and the second polymers of the hollow core binder may be any (co)polymer wherein the glass transition temperature (Tg) of the first polymer is 50° C. or more, preferably, 75° C. or more or, more preferably, 90° C. or more, and the Tg of the second polymer ranges from −30° C. to 60° C., and is, preferably, −20° C. or more or, more preferably, −10° C. or more. The Tg of the first polymer can range up to 150° C. The Tg of the second polymer preferably ranges up to 50° C., or, more preferably, up to 40° C.

One or both of the first and the second polymer may be formed from, as polymerized units, one or more mono-ethylenically unsaturated monomer. Such a polymer may be formed by free radical addition polymerization. The first polymer may comprise, as polymerized units, 50 wt. % or more of nonionic mono-ethylenically unsaturated monomer and, optionally, at least one copolymerized mono-ethylenically unsaturated monomer. Further, the first polymer may comprise, as polymerized units, from 0.05 to 50 wt. %, preferably, 0.2 or more wt. %, or, preferably, up to 35 wt. %, more preferably from 0.5 to 25 wt. %, yet more preferably 1 to 5 wt. %, based on the total weight of monomers used to make the polymer, of multi-ethylenically unsaturated monomers. The core stage of the multi-stage first polymer may optionally contain less than 20% by weight, and preferably from 0.1 to 3% by weight, based on the total weight of the core, of multi-ethylenically unsaturated monomer. Alternatively, one or both of the first polymer and the second polymer may be chosen from condensation polymers, for example, polyester, polyurethane, or polyamide. Preferably the first polymer and the second polymer are formed from predominantly (meth) acrylic, styrene/(meth)acrylic, or vinyl acetate/acrylic monomers; more preferably, the first polymer is formed from monomers chosen from styrene, (meth)acrylic monomers, and mixtures thereof.

In a preferred embodiment, the first polymer or one or more core stage thereof comprises one or more alkali swellable polymer. An alkali swellable first polymer may contain, as polymerized units, one or more mono-ethylenically unsaturated acid or diacid, e.g. (meth)acrylic acid, or one or more acid-free polymerized unit that is hydrolyzable and swellable in alkaline environments at temperatures above the polymer Tg, such as for example, (meth)acrylate esters, vinyl esters of carboxylic acids or mixtures thereof. Alkali swellable polymers may also include alkali soluble polymers, i.e. those containing enough acid that they dissolve in alkali. Accordingly, in a preferred embodiment, the core stage of a multi-stage first polymer comprises, as polymerized units, from 5 to 100 percent by weight, based on a weight of the core stage polymer, of one or more hydrophilic mono-ethylenically unsaturated monomer, preferably a monomer comprising alkali swellable acid or diacid groups or alkali hydrolysable functions, and from 0 to 95 percent by weight, based on the weight of the core polymer, of at least one nonionic mono-ethylenically unsaturated monomer. Acrylic acid and methacrylic acid are preferred hydrophilic monomers.

The second polymer of the hollow core binder may be any film-forming polymer having a suitable Tg, including, but not limited to, emulsion addition (co)polymers and condensation (co)polymers. Where the second polymer is a condensation polymer, it may be grafted onto condensation reactive groups in the first polymer. Thus, for example, where the first polymer comprises amine or hydroxyl groups, the second polymer may be a urethane polymer, an alkyd or a carboxyl functional polyester; likewise, where the first polymer comprises acid groups, the second polymer may comprise a polyester polyol, a polyurethane polyol, or a hydroxyl functional polyester. Suitable addition polymers useful as the second polymer may include, for example, homopolymers, copolymers, terpolymers or tetrapolymers containing, as polymerized units, (meth)acrylates, amine-functional (meth)acrylates, α,β-ethylenically unsaturated (di)acids; vinyl esters, e.g. vinyl acetate and vinyl versatate; styrene; butadiene; vinyl acetate-ethylene; vinyl maleate, and vinyl chloride. Suitable second polymers may further contain up to 10 wt. %, for example, up to 7.5 wt. %, and, preferably, 0.1 wt. % or more, or, preferably, up to 5.0 wt. %, as polymerized units, one or more functional monomer, such as, (di)acid monomer, for example, carboxylic acid, carboxylic anhydride, phosphate, sulfate, sulfonate; amine-group containing monomers, and combinations thereof. Preferably, the second polymer is formed from monomers chosen from butyl acrylate, ethyl acrylate, ethyl hexyl(meth)acrylate, styrene, styrene-butadiene, (di)acid monomer, amine-group containing monomer, and mixtures thereof.

The second polymer, independently, may contain from 0% to 5.0 wt. %, and, preferably, 0.1 wt. % or more, or, preferably, up to 3.0 wt. %, as polymerized units, of one or more multi-ethylenically-unsaturated monomer, based on the total weight of monomers used to make the polymer. Maintaining a sufficiently low level of crosslinking helps to ensure that, in the case of emulsion polymers, effective film formation is not compromised.

Suitable mono-ethylenically unsaturated monomers may include nonionic monomers such as, for example, (meth) acrylic ester monomers including, for example, $C_1$ to $C_{30}$ (cyclo)alkyl(meth)acrylates, such as, for example methyl (meth)acrylate, ethyl methacrylate, butyl(meth)acrylate, 2-ethylhexyl(meth)acrylate, decyl acrylate, lauryl(meth) acrylate, isodecyl(meth)acrylate; (meth)acrylamide, substituted (meth)acrylamides, such as N-alkyl(meth)acrylamides and N,N-dialkyl(meth)acrylamides; ethylene; propylene; styrene and substituted styrenes; butadiene; vinyl esters, such as vinyl acetate and vinyl butyrate; vinyl chloride, vinyl toluene, and vinyl benzophenone; (meth)acrylonitrile; and vinylidene halides, such as, vinylidene chloride. Suitable ionic and hydrophilic mono-ethylenically unsaturated monomers may include, for example, hydroxyalkyl(meth)acrylates; glycidyl(meth)acrylate; mono-ethylenically unsaturated acid monomers; acetoacetoxyethyl(meth)acrylate, acetoacetoxyalkyl(meth)acrylates; amine-group containing monomers, such as vinyl imidazole, 2-(3-oxazolidinyl)ethyl (meth)acrylate and amine-functional(meth)acrylates, such as tert-butylaminoethyl(meth)acrylate, N,N-dimethylaminoethyl(meth)acrylate and N,N-dimethylaminopropyl(meth) acrylate; N-vinyl pyrrolidone; sodium vinyl sulfonate; phosphoethyl(meth)acrylate; acrylamido propane sulfonate; diacetone acrylamide; ethyleneureido-functional monomers; isocyanatoalkyl(meth)acrylate, and allyl acetoacetate.

Suitable mono-ethylenically unsaturated acid or diacid monomers may include, for example, (meth)acrylic acid, itaconic acid, monomethyl itaconate, (meth)acryloxypropionic acid, aconitic acid, fumaric acid, crotonic acid, maleic acid, anhydrides thereof, e.g. maleic anhydride; monomethyl maleate; monoalkyl itaconates; monoalkyl fumarates, e.g. monomethyl fumarate; 2-acrylamido-2-methylpropane sulfonic acid; vinyl sulfonic acid; styrene sulfonic acid; 1-allyloxy-2-hydroxypropane sulfonic acid; alkyl allyl sulfosuccinic acid; sulfoethyl(meth)acrylate; phosphoalkyl(meth) acrylates, such as phosphoethyl(meth)acrylate; phosphodialkyl(meth)acrylates; and allyl phosphate. Preferred acid monomers are (meth)acrylic acid, itaconic acid, fumaric acid and maleic acid.

Suitable multi-ethylenically unsaturated monomers include, for example, those having two or more ethylenically unsaturated bonds, such as, allyl(meth)acrylate, diallyl phthalate, glycol di(meth)acrylates, such as, for example, 1,2-ethyleneglycol di(meth)acrylate, 1,4-butylene glycol di(meth)acrylate, 1,6-hexanediol di(meth)acrylate; and divinyl benzene.

The fast-drying aqueous compositions comprising the hollow core binder polymers may be one component or two component compositions.

One component fast-drying aqueous compositions comprise one or more hollow core binder, one or more polyfunctional amine, and one or more volatile base in an amount sufficient to stabilize the composition by deprotonating the polyfunctional amine, wherein the second polymer of the hollow core binder is chosen from an anionically stabilized emulsion polymer, a polyamine functional emulsion polymer containing pendant amine functionality, a hydrophobic polyamine functional emulsion polymer, a blend of an emulsion polymer having pendant strong cationic groups with an emulsion polymer having pendant weak acid groups, and mixtures thereof. Accordingly, the second polymer of the hollow core binder in one component aqueous compositions can comprise the polyfunctional amine.

Two component fast-drying aqueous compositions comprise one or more hollow core binder having a second polymer binder, and an absorber component. In two component fast-drying aqueous compositions, suitable hollow core binders may be any having a film-forming second polymer having a glass transition temperature (Tg) of from −30° C. to 60° C.

One component fast-drying aqueous compositions may comprise one or more volatile base in an amount sufficient to raise the pH to 7.5 or higher, for example, an amount of volatile amine sufficient to ensure that the polyfunctional amine is in a non-ionic state (deprotonated) and one or more polyfunctional amine, and one or more hollow core binder.

In one embodiment, one component fast-drying aqueous compositions comprise hollow core binders with a second polymer comprising an anionically stabilized emulsion polymer. The anionically stabilized emulsion polymer may comprise functional groups that are anionic when deprotonated, such as, for example, carboxylic acids, anhydrides, and aldehydes. The anionically stabilized emulsion polymer is stabilized by surfactants, including anionic surfactants, non-ionic surfactants, or mixtures of anionic and non-ionic surfactants. Preferably, the anionically stabilized polymer emulsion comprises, as polymerized units, two or more ethylenically unsaturated monomers, wherein from 0 to 5 wt. % of the monomers are $\alpha,\beta$-ethylenically unsaturated aliphatic carboxylic acid monomers.

In another embodiment, one component fast-drying aqueous polymer compositions comprise hollow core binders with polyamine functional emulsion second polymers with pendant amine-functional groups. The hollow core binder emulsion polymers with polyamine functional second polymers having pendant amine-functional groups may also have pendant acid-functional groups or they may be blended with one or more emulsion polymer that has pendant acid-functional groups, such that the ratio of amine-functional groups to acid-functional groups in the copolymer or the polymer blend is 3.0 to 1.0 or higher. Suitable second polymers having pendant amine functionality may comprise, as polymerized units, two or more ethylenically unsaturated monomers, wherein 2.0 wt. % or more, based on total monomers of the second polymer, are $\alpha,\beta$-ethylenically unsaturated amine-functional monomers. Acid functional monomers polymerized to prepare acid-functional group containing emulsion second polymer particles are used in amounts of 10% wt. % or less, based on total monomers of the second polymer. Suitable emulsion polymers containing pendant amine functionality are disclosed in U.S. Pat. No. 5,922,398.

In yet another embodiment, one component fast-drying aqueous compositions comprise hollow core binders having hydrophobic polyamine functional emulsion second polymers formed from polymerizable monomers including (a) alkyl esters of acrylic or methacrylic acid where the alkyl ester is a $C_1$-$C_{18}$ alkyl ester; (b) from 0.1 to 5 wt. %, based on the acrylic or methacrylic film forming polymer of at least one secondary or tertiary amino(meth)acrylate monomer, and (c) from 0.1 to 5 wt. %, based on the acrylic or methacrylic film forming polymer of a crosslinkable monomer selected from the group consisting of (meth)acrylamide, and N-alkylol acrylamide and having less than 5.0 wt. % of hydrophilic monomers, based on total weight of the second polymer, preferably, 3.0 wt. % or less.

In yet still another embodiment, the one component fast-drying aqueous compositions may comprise a blend of one or more hollow core binder emulsion polymer having a second polymer with pendant strong cationic groups and one or more hollow core binder emulsion polymer having a second polymer with pendant weak acid groups. The cationic groups may comprise, for example, quaternary ammonium moieties, and the weak acid groups may comprise, for example, carboxylic acid moieties. In the hollow core binder polymer blend, the emulsion polymer having pendant strong cationic groups is cationically stabilized and the emulsion polymer having the weak acid groups is anionically stabilized such that the oppositely charged surfactants interact upon mixing, thereby inactivating one another and freeing up the polymers to interact. Further, upon mixing, it is possible to adjust the pH of the aqueous dispersion such that the weak acid moieties are deprotonated and available to interact with cationic groups upon film formation to accelerate drying.

In even yet another embodiment, two component fast-drying aqueous compositions comprise any suitable aqueous hollow core binder polymer having a film-forming second polymer with a Tg of from −30° C. to 60° C., and an absorber component having one or more absorber. Absorbers further increase the drying rate of aqueous binder compositions and can thereby render fast-drying aqueous compositions. The absorber may be combined with one or more aqueous hollow core binder composition during or after application to a substrate, e.g. while the applied binder composition is still wet.

Suitable absorbers may include organic absorbers, such as, for example, hollow sphere polymers or void containing polymers; ion exchange resins (IER), preferably crosslinked IERs; sumica gel (a copolymer of sodium methacrylate and/or ammonium methacrylate), inorganic absorbents, such as talc, clay, calcium oxide, Portland cement, and gypsum; molecular sieves, such as zeolites; non-porous carbonaceous materials, such as carbon blacks and pyrolyzed polyacrylonitrile; porous carbonaceous materials, such as activated carbons; and superabsorbent polymers. The average particle size of an absorber may range from 0.05 μm to 5000 μm, preferably, 10 μm or more and, preferably, up to 1500 μm. The proper amount of absorber may depend upon one or more of the type of binder composition used, water content of the aqueous dispersion, type of absorber, paint application conditions, and other ingredients present in the paint formulation. Suitable amounts of one or more absorber may range from 0.01 wt. % to 90 wt. %, based on the total weight of the coating composition, preferably, 0.1 wt. % or more, or, preferably, up to 70 weight %, or, more preferably, 1 wt. % or more, or up to 30 wt. %.

The hollow core binder of the present invention may be formed by various polymerization and swelling techniques known in the art. Thus, the hollow core binders of the present invention may be formed by emulsion polymerization. The second polymer is polymerized in the presence of the first polymer. For example, the hollow core binder may be formed by multi-stage emulsion polymerization to form a core-shell copolymer as the first polymer, adding to the aqueous emulsion polymerized core-shell copolymer and polymerizing in the presence of the core-shell polymer one or more mono-ethylenically unsaturated monomer to form the second polymer, and, further, adding a swelling agent to the aqueous dispersion prior to, during, or after the polymerization of the mono-ethylenically unsaturated monomers of the second polymer. The second polymer may be formed in the same reaction vessel or kettle as the first polymer. Alternatively, the second polymer may be formed after a period of time in a different reaction vessel or kettle, such as a holding tank or a drain tank. The polymerization temperature of the second polymer should be at least 30° C. lower than the calculated Tg of the first polymer.

In a preferred embodiment, at least 10 wt. %, preferably 20 wt. %, more preferably 50 wt. %, and, most preferably, 100 wt. % of the total of the second polymer is formed by polymerization at a temperature of from 5° C. to 65° C., preferably 10° C. to 50° C., more preferably 20° C. to 40° C., wherein the polymerization temperature is at least 30° C. lower than the Tg of the first polymer. In this embodiment, the temperature at which the second polymer is formed may be allowed to rise above 65° C. during the formation of the second polymer with the proviso that at least 10% of the second polymer is formed at a temperature of from 5° C. to 65° C., wherein the polymerization temperature is at least 30° C. lower than the Tg of the first polymer.

In another preferred embodiment, the concentration of unpolymerized monomer in the reaction vessel is, at any time (T), is no greater than 6%, preferably, no greater than 5%, and more preferably, no greater than 4%, by weight, based on the total weight of reaction mixture present in the reaction vessel at time (T).

Each of the first and second polymer may be prepared such that surfactants, initiators, and other additives are selected independently, i.e. they may be the same or different in kind and amount for each polymer. In any emulsion polymerization process, conventional surfactants may be used, including anionic emulsifiers, such as, for example, alkali metal or ammonium salts of alkyl, aryl, or alkylaryl sulfates, sulfonates or phosphates, e.g. sodium lauryl sulfate, sodium polyoxyethylene lauryl ether sulfate, sodium salt of tert-octylphenoxyethoxypoly(39)ethoxyethyl sulfate, sodium dodecyl benzene sulfonate, sodium dodecyl diphenyloxide disulfonate, other diphenylsulfonate derivatives, alkyl sulfonic acids, sulfosuccinic acids and salts, e.g. dioctylsulfosuccinates, fatty acids and their salts; nonionic surfactants, such as, for example, ethoxylated alcohols or phenols and ethylenically unsaturated surfactant monomers; amphoteric surfactants, or mixtures thereof. The amount of surfactant used may range from 0.1 to 6 wt. %, based on the weight of monomer used to form any polymer.

The first polymer and the second polymer may, independently, be polymerized via free radical polymerization, including, for example, thermal, redox (using redox catalysts), photochemical, and electrochemical initiation. During the interval in which the polymerization reaction temperature is maintained at from 5° C. to 65° C. during the formation of at least 10% by weight of the second polymer, a redox polymerization process is preferred.

Suitable free radical initiators or oxidants may include, for example, persulfates, such as, for example, ammonium and/or alkali metal persulfates; peroxides, such as, for example, sodium or potassium hydroperoxide, t-alkyl peroxides, t-alkyl hydroperoxides, dicumyl hydroperoxide; or t-alkyl peresters, wherein the t-alkylgroup includes at least 5 carbon atoms; perboric acids and their salts, such as, for example, sodium perborate; perphosphoric acids and salts thereof; potassium permanganate; and ammonium or alkali metal salts of peroxydisulfuric acid. Such initiators may be used in amounts ranging from 0.01 wt. % to 3.0 wt. %, based on the total weight of monomers.

Suitable redox catalysts comprise one or more oxidant with a suitable reductant. Suitable reductants may include, for example, sodium sulfoxylate formaldehyde; (iso)ascorbic acid; alkali metal and ammonium salts of sulfur-containing acids, such as sodium (bi)sulfite, thiosulfate, hydrosulfite, (hydro)sulfide or dithionite; formadinesulfinic acid; hydroxymethanesulfonic acid; sodium 2-hydroxy-2-sulfinatoacetic acid; acetone bisulfite; amines, such as ethanolamine, glycolic acid; glyoxylic acid hydrate; lactic acid; glyceric acid, malic acid; tartaric acid; and salts of thereof may be used in amounts of 0.01 wt. % to 5.0 wt. %, based on the total weight of monomers.

Redox reaction catalyzing metal salts of iron, copper, manganese, silver, platinum, vanadium, nickel, chromium, palladium, or cobalt may be added for the formation of the first polymer and the second polymer. Typical levels of catalytic metal salts used in accordance with the invention range from 0.01 ppm to 25 ppm, and may range up to 1.0 wt. %, based on the total weight of monomers. Mixtures of two or more catalytic metal salts may also be usefully employed. Chelating ligands, which can be used with catalytic metal salts, include multidentate aminocarboxylate ligands, such as, for example, nitrilotriacetic acid (NTA, a tetradentate ligand), ethylene diamine diacetic acid (EDDA, a tetradentate ligand), N-(hydroxyethyl)ethylene diamine triacetic acid (HEDTA, a pentadentate ligand), and ethylene diamine tetraacetic acid (EDTA, a hexadentate ligand).

Chain transfer agents, such as, for example, mercaptans, such as alkyl thioglycolates, alkyl mercaptoalkanoates, and $C_4$-$C_{22}$ linear or branched alkyl mercaptans; halogen compounds, including tetrabromomethane; or mercaptocarboxylic acids may be used to control the molecular weight of the first polymer and second polymer. Chain transfer agent(s) may be added in one or more additions or continuously, linearly or not, over most or all of the entire reaction period or during limited portion(s) of the reaction period. Suitable amounts of chain transfer agents range from 0.25 to 10 wt. %, based on the total weight of monomers.

Any monomer in any polymerization may be added neat, i.e. not as an emulsion in water, or as an emulsion in water. The monomer may be added in one or more additions or continuously, linearly or not, over the reaction period, or combinations thereof. In the case of polyesters or polyamides, the reactant polyacid and polyol, or polyamines, may be polymerized in bulk in the presence of known condensation catalysts, such as trialkyl tin oxides.

The first polymer and the second polymer may, independently, comprise single stage polymers, i.e. made by single stage polymerization, or they may include more than one phase, such as, for example, those formed by a multistage emulsion polymerization. Preferably, the first polymer is formed by multistage polymerization.

Multistage emulsion polymerization can result in the formation of at least two mutually incompatible polymer compositions, and, thereby, in the formation of at least two phases within the polymer particles. Such particles are composed of two or more phases of various geometries such as, for example, core/shell or core/sheath particles, core/shell particles with shell phases partially encapsulating the core, core/shell particles with a multiplicity of cores, and interpenetrating network particles. Multistage emulsion copolymers can be formed in two or more stages, where the stages differ in molecular weight as well as composition. For example, the core and shell of a preferred first polymer may themselves be comprised of more than one stage. There may also be one or more intermediate stage. Preferably, the multi-stage polymer comprises a core, an intermediate layer and a shell. The intermediate layer is described in U.S. Patent Publication No. 20010009929A.

In a preferred embodiment, the hollow core binder of the present invention is formed by methods comprising providing an aqueous dispersion of multi-stage emulsion polymer comprising a core stage polymer (the "core") and a first shell stage polymer (the "first shell"), forming a second shell stage polymer (the "second shell"), which substantially encapsulates the first shell stage polymer, by adding to the emulsion of multi-staged polymer at least one mono-ethylenically unsaturated monomer and causing the monomer to polymerize in the presence of the multi-staged polymer, wherein the polymerization temperature is at least 30° C. lower than the calculated $T_g$ of the first shell stage polymer. The core of the multi-stage emulsion polymer is caused to swell by the addition of a swelling agent to the aqueous dispersion prior to, during, or after the polymerization of the monomers comprising the second shell stage polymer. This preferred process is as described in U.S. Patent Publication No. 20010009929A.

The hollow core binder particles of the present invention have an average particle size of from 200 nanometers (nm) or more, and may range up to 500 nm, preferably up to 470 nm, more preferably, 300 nm or more or, more preferably, 320 nm or more. Above an average particle size 500 nm, the compositions exhibit an increase in the rate of paint sedimentation and an increased high shear viscosity which makes the paint spray poorly; below a 200 nm average particle size, the hollow core binder compositions fail to exhibit acceptable light scattering for opacity. The applicants have discovered that hollow core binders having lower average particle size provide compositions having a reduced viscosity in formulation.

In a multi-stage first polymer, the first polymer or a core stage of has an average particle size diameter of from 50 nm to 250 nm, and preferably, from 50 nm to 200 nm, in an unswollen condition. If the core is obtained from a seed polymer, such as one described in US Publication No. 20010009929, the seed polymer, preferably, has an average particle size of from 30 nm to 150 nm.

The first polymer includes, when dry, at least one void having an average size ranging 50 nm or more, preferably 100 nm or more, and may range up to 300 nm. Where the hollow core binder particles increase the opacity of coatings or films in which they are present, preferable void sizes range from 200 to 300 nm. If the particles have voids or hollows below of 100 nm, then the hollow core binder fails to exhibit desirable light scattering.

Single void containing polymers formed by multistage emulsion polymerization and methods of making them are known in the art, as disclosed in U.S. Pat. Nos. 4,427,836; 4,469,825; 4,594,363; 4,970,241; 5,225,279; 5,494,971; 5,510,422; 5,527,613; 6,020,435; 6,139,961; 6,673,451; and 6,784,262; as well as in U.S. Patent Publication Nos. 20010009929A; 20010036990A; and 20030129435A.

One or more hollow or void may be formed in the first polymer of the hollow core binder by known methods, including swelling, e.g. alkali swelling or alkali hydrolysis and swelling, of the first polymer or of the core of a multi-stage first polymer particle, or by dissolving out at least part of or at least part of a core stage of the first polymer particle to form, when dry, a void, e.g. via the removal of encapsulated fugitive substances or removable porogens therefrom, the use of blowing agents contained therein and activated after polymerization, or the use of solvents to dissolve out portions of a copolymer. Accordingly, the core of a multi-stage first polymer may comprise a swellable polymer, such as an alkali swellable polymer, or a solvent soluble polymer, such as polymers soluble in water or in organic solvents. Alternatively, a single stage first polymer or core of a multi-stage first polymer may contain a fugitive, porogen or blowing agent substance to form one or more void.

Suitable first polymers may also contain, when dry, two or more voids, whether isolated or connected to other voids, whether substantially spherical in shape or not, including, for example, void channels, interpenetrating networks of void and polymer, and sponge-like structures, such as are disclosed, for example, in U.S. Pat. Nos. 5,036,109; 5,216,044; 5,521,253 and 5,989,630. Multiple voids may be formed within a core polymer particle fully or partially enclosed by a first polymer or in an internal stage of a multistage first polymer.

Swelling is generally very efficient, i.e., swelling in minimum amount of time under conditions of elevated temperature in the presence of monomer and no substantial polymerization occurring. Under these conditions, swelling is generally complete within 30 minutes, preferably within 20 minutes, and most preferably within 10 minutes, of adding the one or more swelling agents. Preferably, suitable amounts of swelling agent range from 75 to 1000%, and, more preferably, from 200 to 960%, based on the equivalents of the functionality in the core of the first polymer capable of being neutralized by the swelling agent. It is also preferable to add the one or more swelling agents to the multistage emulsion polymer while the multi-stage first polymer is at an elevated temperature, preferably at a temperature within 10° C. of the shell polymerization temperature.

In embodiments wherein the first polymer comprises an alkali hydrolysable core or inner stage, e.g. poly(alkyl(meth) acrylate), voids may be formed by exposing the aqueous dispersion of the first polymer to a strong alkaline solution, such as sodium hydroxide, at a temperature above room temperature and below 140° C., in an amount of from about 0.75 to about 1.5 equivalents of base, based on all the acids in the shell phases and the more easily hydrolysable acrylate esters in the core or inner stage, such as methyl acrylate.

In another embodiment, the core of the preferred multistage first polymer may be caused to swell by addition of one or more swelling agent to the aqueous dispersion prior to, during, or after the polymerization of the monomers comprising the second shell stage polymer, and after the formation of the first shell polymer. Preferably, the swelling agent is added to the aqueous dispersion at a time when the aqueous dispersion comprises at least 0.5 wt. %, based on the total weight of the polymer in the dispersion, of unreacted monomer under conditions where there is no substantial polymerization of the monomer, followed by reducing the level of monomer by at least 50%. The phrase "under conditions wherein there is no substantial polymerization of the monomer" and the techniques for achieving such conditions are as described in U.S. Patent Publication No. 20010009929A. Reducing the level of monomer to less than 10,000 ppm, and preferably to less than 5,000 ppm, based on polymer solids, can be accomplished by any suitable means, such as solvent fractionation and, preferably, by polymerizing the monomer, such as, for example, by adding one or more initiators recited above. Preferably, reduction of the level of monomer is begun within 20 minutes, and more preferably within 10 minutes, of adding the one or more swelling agents.

Suitable swelling agents may include those which, in the presence of a core-shell first polymer emulsion and monomer(s) used to form the second polymer, are capable of permeating the first polymer shell and swelling the core. Swelling agents may be aqueous or gaseous, volatile or fixed bases, or combinations thereof. Suitable swelling agents include volatile bases, such as ammonia, ammonium hydroxide, and volatile lower aliphatic amines, such as morpholine, trimethylamine, and triethylamine; fixed or permanent bases, such as potassium hydroxide, lithium hydroxide, zinc ammonium complex, copper ammonium complex, silver ammonium complex, strontium hydroxide, and barium hydroxide. Solvents, such as, for example, ethanol, hexanol, octanol and those described in U.S. Pat. No. 4,594,363, may be added to aid in fixed or permanent base penetration. Ammonia and ammonium hydroxide are preferred.

Suitable removable porogens, may include, for example, titanium dioxide and silicon oxide, which are removable with aqueous acid.

In one embodiment, the first polymer of the invention is formed in the presence of at least one fugitive substance, i.e., any substance having a normal boiling point of less than 30°

C., as taught in U.S. Pat. No. 6,632,531, and the second polymer of the invention is polymerized in the presence of the first polymer. In such embodiments, the second polymer may be formed either before or after the removal of the fugitive substance. Suitable fugitive substances may include, for example supercritical carbon dioxide, oxidizable compounds that leave voids on oxidation, and blowing agents. Preferably, fugitive substances are chosen from supercritical carbon dioxide, $C_1$-$C_4$ alkanes, e.g., butane, 2,2-dimethylpropane, and dimethyl ether. Other fugitive substances may include, for example, $C_1$-$C_4$ haloalkanes, such as $C_1$-$C_4$ chlorofluoroalkanes or $C_1$-$C_4$ perfluoroalkanes, 1,1,1,2-tetrafluoroethane, difluoromethane, sulfur hexafluoride, carbon dioxide, methane, and combinations thereof.

To enable formation of one or more void therein, in one embodiment, the first polymer may comprise an organic solvent soluble polymer as a core of a multi-stage copolymer, one polymer of in a first polymer as an interpenetrated network (IPN), or a copolymerized portion of a single stage first polymer. Voids may be formed, for example, by solution polymerizing monomers comprising 5 to 100 wt. %, based on total monomer weight, of one or more hydrophilic monoethylenically unsaturated monomer and the remainder of one or more organic solvent soluble ethylenically unsaturated monomer, in a water-immiscible or hydrophobic solvent or solvent mixture, to form a separate first polymer, a stage of a first polymer, or one of two or more first polymers in an IPN, and, subsequently, solution polymerizing hydrophobic (co)monomer or (co)reactant in a separate stage or separate polymer to make a first polymer or a stage thereof in solution, dispersing the solution comprising the thus formed copolymer or polymer mixture in water in the presence of a base, and distilling to remove the organic solvent down to a concentration of less than 5% by weight, based on the amount of the dispersion, replacing the solvent with water. The second polymer can then be emulsion polymerized in the presence of the resulting aqueous first polymer dispersion to make the hollow core binder of the present invention. After subsequent drying, the dry dispersion can be re-dispersed in water in the presence of base, e.g. ammonia.

Suitable organic solvent soluble polymers and the solvents in which they dissolve are described, for example, in U.S. Pat. No. 5,989,630 and may comprise, as polymerized units, any nonionic mono-ethylenically unsaturated monomer or diene, such as butadiene. Suitable solvents may comprise toluene; (cyclo)aliphatic hydrocarbons, e.g. n-hexane; or a mixture of a good solvent for the polymer and a very poor solvent (coagulant) for the polymer.

The aqueous dispersion of hollow core binder particles may have a solids content of 30 wt. % or more, and preferably, 40 wt. % or more, or, preferably, up to 50 wt. %. Aqueous hollow core binder compositions with too low a solids content will not dry fast enough in practice; however, such compositions cannot be processed above 50 wt. % solids content. The aqueous phase of the dispersion composition includes water and optionally, one or more water miscible organic solvents, such as, methanol, ethanol, glycols, and glycol ethers.

In formulating fast-drying aqueous binder compositions, the volatile base is added to the aqueous hollow core binder before any polyfunctional amine, if used, to insure stability. Preferably, the volatile base is combined with the aqueous hollow core binder as soon as is practicable after polymerization. Because they may be corrosive, fast-drying binder compositions should be formulated in glass, glass lined or non-ferrous metal containers, such as stainless steel.

In one component fast-drying aqueous binder compositions, the type and amount of volatile base used may be sufficient to raise the pH of the fast-drying aqueous dispersion composition to the point where a desired proportion of the polyfunctional amine is in a non-ionic state (deprotonated). In the non-ionic state (i.e. deprotonated), polyfunctional amine interaction with the anionically stabilized emulsion and any other anionic ingredients which may be present in the composition is minimized. The volatile base must be volatile enough to be released under air drying conditions. During film formation, the volatile base evaporates with the result that the amine moieties of the polyamine functional polymer become protonated to form ammonium moieties which, in turn, interact with the anionic ingredients to destabilize the coating composition and thereby accelerate drying. Suitably, from 20 to 100 mole % of the amino groups of the polyfunctional amines may be deprotonated, preferably from 60 to 100 mole %, more preferably from 80 to 100 mole %, and most preferably from 90 to 100 mole %. Accordingly, suitable pH ranges for fast-drying aqueous dispersions may range from 7.5 to 11, preferably 9 or higher, more preferably, from 9.5 to 10.7. Suitable amounts of a volatile base may range from 0.2 to 5 wt. %, based on the total weight of the hollow core binder polymer aqueous dispersion, the polyfunctional amine, and the volatile base. Suitable volatile bases may include any of ammonia, $C_1$-$C_6$ alkyl amines and $C_1$-$C_6$ alkanolamines, such as, for example, butylamine, propylamine, ethylamine, ethylenediamine, trimethyl amine, triethyl amine, diethylamine, diethanolamine, ethanolamine, 2-methylaminoethanol, 2-dimethylaminoethanol, morpholine, and N-methylmorpholine. Preferably, the volatile base is ammonia, or an admixture thereof with other volatile or nonvolatile bases.

Polyfunctional amines, as defined herein, comprise amine-functional polymers having a weight average molecular weight of 1,000 or more. Polyfunctional amines may include, for example, polymers formed from either an amine-group containing monomer or an imine monomer, for example from 20 to 100 wt. % of such a monomer as polymerized units. Examples of the amine containing monomers include aminoalkyl vinyl ether or sulfides; acrylamide or acrylic esters, such as dimethylaminoethyl(meth)acrylate; N-(meth)acryloxyalkyl-oxazolidines such as poly(oxazolidinylethyl methacrylate), N-(meth)acryloxyalkyltetrahydro-1,3-oxazines, and monomers that readily generate amines by hydrolysis, as disclosed in U.S. Pat. No. 5,804,627. Polymers prepared using imine monomers contain no imine functionality and, instead, contain amine functionality as part of the polymer backbone. Suitable polyfunctional amines may include, for example, poly(oxazolidinylethyl methacrylate), poly(vinylamine), polyalkyleneimine, e.g. poly(ethyleneimine), and aqueous hollow core binder dispersions comprising as a second polymer a polymer containing pendant amine groups or strong cationic groups. U.S. Pat. No. 5,672,379 discloses additional polyfunctional amines.

Suitable amounts of the polyfunctional amine may range from 0.1 to 10 wt. %, based on the total weight of the hollow core binder aqueous dispersion, the polyfunctional amine, and the volatile base, preferably 0.2 wt. % or more, or, preferably, 5.0 wt. % or less, and, more preferably, 0.5 wt. % or more or, more preferably, 2.0 wt. % or less. The polyfunctional amine may, alternatively, be present in the coating composition, or it may be added as a separate component before, during or after the dispersion composition is applied.

Coating and traffic paint formulations may contain additional formulation ingredients, such as, for example, thickeners, such as polyvinyl alcohol (PVA), hydroxyethyl cellulose (HEC), alkali-soluble or alkali-swellable emulsions (ASE), cellulosic thickeners, fumed silica, and attapulgite clay; rheology modifiers; pigments, such as titanium dioxide, organic pigments, and carbon black; extenders such as calcium carbonate, talc, clay, silicas, and silicates; fillers, such as glass or polymeric microspheres, quartz(ite) and sand; colorants; plasticizers; crosslinking agents; adhesion promoters, such as silanes; tackifiers; coalescents, for example, alkylene glycols; 2,2,4-trimethyl-1,3-pentanediol monoisobutyrate, glycol ethers; dispersants; wetting agents; surfactants; dyes; sequestering agents; preservatives; biocides; anti-freeze agents; slip additives; waxes; freeze/thaw protectors; defoamers; corrosion inhibitors; and anti-flocculants.

Thickeners may include any material added to a coating to modify its rheological profile. Preferably, thickeners comprise associative thickeners, such as, for example, hydrophobically-modified, alkali soluble emulsions (HASE), hydrophobically-modified ethylene oxide-urethane polymers (HEUR), and hydrophobically-modified hydroxy ethyl cellulose (HMHEC).

Suitable dispersants may include non-ionic, anionic, and cationic dispersants, such as, for example, 2-amino 2-methyl 1-propanol (AMP), dimethyl amino ethanol (DMAE), potassium tripolyphosphate (KTPP), trisodium polyphosphate (TSPP), citric acid and other carboxylic acids; anionic polymers such as homopolymers and copolymers based on polycarboxylic acids, including those that have been hydrophobically- or hydrophilically-modified, e.g. poly(meth)acrylic acid with various comonomers such as styrene, or alkyl(aryl)(meth)acrylate esters, salts of the aforementioned polymers, as well as mixtures thereof.

One or more surfactant may be used to stabilize the emulsion polymerization systems before, during, and after polymerization of monomers and may be present at levels of from 0.1 to 6 wt. % based on the total weight of monomer in polymerization. Suitable surfactants include cationic, anionic, and non-ionic surfactants. Anionically stabilized emulsion polymers may be stabilized by anionic surfactant or a mixture thereof with one on more nonionic surfactant.

Suitable defoamers may include silicone-based and mineral oil-based defoamers, and the like. Suitable biocides and mildewcides may include zinc oxide, isothiazolones, triazoles, and benzotriazoles.

The formulated coating compositions or traffic paints may have a PVC of 70% or less, preferably 62% or less, or, preferably, 50% or more.

Methods of producing coatings, such as roadway markings on a road surface, may comprise applying onto the substrate or road surface one or more layer of the fast-drying aqueous composition and evaporating the volatile base therefrom to provide the traffic marking on the road surface and/or allowing the absorber component to absorb aqueous liquid. Accordingly, methods of forming coatings with may comprise applying an aqueous hollow core binder composition to a substrate and, separately, applying one or more absorber component to the substrate simultaneously with, before, or after the step of application of the aqueous hollow core binder composition while it is still wet or fluid.

Various applications methods are known in the art, including spraying the composition on the road surface using pressurized spray guns, such as, for example truck mounted spray guns supplied with paint via air pressurized tanks or airless pumps. Other methods include applying the composition by hand using a paint brush or a paint roller. Coatings may be applied in one or more layer. Preferably, the substrate is cleaned prior to application to remove any dirt or sediments. Whether it comprises one layer or more than one layer, a suitable thickness of the dried film generally ranges from 100 μm to 600 μm, preferably 200 μm or more, and, preferably, up to 450 μm.

In yet another embodiment to improve the visibility of the roadway markings, application methods may include applying glass beads on the layer of the traffic paint or coating while the layer is still wet to ensure the adhesion of the glass beads to the traffic paint layer or premixing them into the traffic paint prior to application. The glass beads may be applied by known methods, such as, for example, by spraying the glass beads entrained in and conveyed by a jet of air atop the traffic paint layer, or by sprinkling the glass beads from a storage hopper positioned above the applied traffic paint. The amount of glass beads applied on the coating layer may range from 250-600 grams per square meter of the coating layer for visibility at night. Suitable glass beads specified for roadway markings may have an average particle size ranging from 50 to 1500 μm.

The compositions are suitable for coating or forming films on substrates such, as, for example, roads, and traffic control devices such as guardrails and concrete barriers, roof tops, walls, for example, in exterior insulation finishing systems (EIFS), walkways, runways, parking areas, and indoor floors (such as in factories or shopping malls). Typical substrates include, for example, masonry, tar, asphalt, resin, concrete, cement, stone, stucco, tile, polymeric materials, metals, such as aluminum, stainless steel, or carbon steel, and combinations thereof. All of the substrates may already have one or more layers of an existing coating or paint which may be fresh or aged.

EXAMPLES

The following examples illustrate the present invention. In the examples, the following abbreviations have been used:

BA is Butyl Acrylate; DVB is divinyl benzene; MMA is Methyl Methacrylate; MAA is Methacrylic Acid; t-BHP is t-Butyl Hydroperoxide (70%); SDS is Sodium Dodecylbenzenesulfonate (23%); DI is Deionized; SPS is Sodium Persulphate; ALMA is Allyl Methacrylate; L is liter; wt is weight; vol is volume; g is gram; and min is minute.

Test Methods:

Abrasive Scrub Resistance: The aqueous coating compositions were drawn down on black vinyl charts using a 0.178 mm (7 mil) opening film caster. The charts were air dried in a horizontal position for 21 days in a room kept at 23° C. (73.5° F.)+/−2.0° C. and 50+/−5% relative humidity. The abrasive scrub resistance was determined by abrading the dried films with a nylon bristle brush and standardized scrub medium SC-2 for ASTM Method D2486 (last revision 2006) supplied by The Leneta Company, Inc. (Mahwah, N.J.). The paint charts were secured in a Straight Line Washability and Abrasion Machine manufactured by Paul N Gardner Co., Inc (Pompano Beach, Fla.) on an aluminum plate containing 0.254 mm (10 mil) shims. The brush was mounted in the holder and 10 grams of scrub medium were spread evenly on the brush bristles. After each 400 cycles before failure, 10 more grams of scrub medium and 5 grams of water was added. The number of cycles to remove the paint film fully in one continuous line across the 12.7 mm (½ inch) width of the shim was recorded. The reported values were an average of two measurements.

Hiding by Contrast Ratio: The aqueous coating compositions were drawn down on opacity charts (Form 5C, The Leneta Company, Inc.) using a 0.254 mm (10 mil) opening film caster. The charts were air dried in a horizontal position for 7 days in a room kept at 23° C. (73.5° F.)+/−2.0° C. and 50+/−5% relative humidity. A Y-Reflectometer (Paul N Gardner Co., Inc.) with a 45/0 geometry was used to measure the Y component of light reflectance of the XYZ color scale. A 45/0 geometry indicates that the light is incident to the coating at an angle of 45 degrees from normal, and that the scattered light is collected at an angle of 0 degrees from normal. The Y component reflectance was measured three times over the white and the black portions of the coated opacity charts. The contrast ratio was determined by dividing the average Y reflectance over the black section by the average Y reflectance over the white section.

Flexibility by angle to crack over an 0.32 mm Mandrel: The aqueous coating compositions were drawn down on aluminum panels using a 0.508 mm (20 mil) opening film caster. The panels were air dried in a horizontal position for 21 days in a room kept at 23° C. (73.5° F.)+/−2.0° C. and 50+/−5% relative humidity. Two 25.4 mm strips of each panel were centered over the 0.32 mm (⅛ inch) bar of a Mandrel Bend Test Apparatus (Paul N Gardner Co., Inc.). The strips were slowly bent over the Mandrel bar until cracks began to form when viewed with an unaided eye. The angle of the bend was determined by placing the bent strips on a protractor. The average of the duplicated angle to crack results were reported.

High Shear Viscosity: A Brookfield CAP 1000 Cone and Plate Viscometer was used to measure the viscosity of the aqueous coating compositions at high $(10,000 \text{ s}^{-1})$ shear rates. After cleaning the cone and plate with acetone, the cone arm was lowered to contact the plate and allowed the thermostatically controlled plate to equilibrate to 25° C. The cone arm was raised and 3 to 4 drops of the aqueous coating composition was applied to the plate. The cone arm was lowered and activated and the high shear viscosity (poise) was recorded. Aqueous coating compositions with high shear viscosities above 3 poise do not atomize well when applied with air assisted spray equipment, resulting in a non-uniform coverage of the substrate.

Air Assisted Sprayability: An aqueous coating composition was placed in a container ("pot") and pressurized with compressed air to deliver the coating material to a Binks Model 21M air assisted spray gun. The coating material was atomized at the spray gun tip with compressed atomization air. The spray volume and uniformity of coverage of the substrate were controlled by adjusting the "pot" and atomization air pressure.

The sprayability was rated as "good" if there was uniform coverage of the substrate.

Polymer Core:

In Examples 1, 3, 5 and 7 below, the polymer core used in the preparation of the hollow core binder comprised a 66 MMA/34 MAA wt. % polymer core prepared via aqueous emulsion polymerization according to U.S. Pat. No. 6,020,435. The polymerization product was filtered to yield a filtered dispersion. The filtered polymer core dispersion used in Example 1, below, had a solids content of 30.8 wt. % an average particle size of 93 nm. The filtered polymer core dispersion used in Example 3, below, had a solids content of 31.5 wt. % an average particle size of 136 nm. The filtered polymer core dispersion used in each of Example 5 and 7, below, had a solids content of 32.1 wt. % an average particle size of 107 nm.

Example 1

Preparation of Unswollen First Polymer

A 5 L, four necked round bottom flask was equipped with paddle stirrer, thermometer, nitrogen inlet, and reflux condenser. DI water, 1200 g, was added to the kettle and heated to 89° C. under a nitrogen atmosphere. To the heated kettle water was added 5.25 g of sodium persulfate dissolved in 30 g of DI water. This was immediately followed by 324.7 g of the polymer core. A monomer emulsion (ME I) which was prepared by mixing 100 g of DI water, 6.7 g of SDS (sodium dodecyl benzene sulfonate, 23%), 100.0 g of styrene, 88.0 g of MMA, and 12.0 g of MAA was added to the kettle over a period of 60 min at a temperature of 78° C. After adding ME I, a second monomer emulsion (ME II) was prepared by mixing 400 g of DI water, 18.0 g of SDS (23%), 1170.0 g of styrene, 18.0 g of methacrylic acid, 6.0 g of linseed oil fatty acid (LOFA), and 12.0 g of allyl methacrylate. Monomer Emulsion II (ME II) was added to the kettle along with a separate mixture of 1.3 g of sodium persulfate dissolved in 90 g of DI water over 70 min. The temperature of the reaction mixture was allowed to increase to 92° C. Upon completion of the ME II and co-feed, the reaction mixture was held for 10 min at 85° C. and then cooled to room temperature and filtered to remove any coagulum formed. The final unneutralized latex had a solids content of 40.0%, an average particle size of 221 nm, and a pH of 2.7.

Example 2

Formation of Aqueous Dispersion of Hollow Core Binder Polymer

Using the same equipment as in Example 1, 1125.0 grams of the first polymer of Example 1 along with 50 g of DI water was added to the kettle and the temperature was adjusted to 24° C. A monomer emulsion (ME I) was prepared by mixing 229.1 g of DI water, 12.7 g of SDS, 313.1 g of MMA, 9.0 g of MAA, and 443.0 g of BA. With the kettle temperature at 24° C., a solution of 13.3 g of 0.15% ferrous sulfate mixed with 2 g of 1% tetrasodium ethylenediamine tetraacetate, available as Versene™ (Dow Corp., Midland Mich.), was added to the kettle. Next, co-feeds including a solution of 2.8 g of t-BHP (70%) mixed with 80.0 g of DI water, along with a separate solution of 2.0 g of iso-ascorbic acid mixed with 80.0 g of DI water were both added to the kettle at a rate of 1.2 g/min. Two minutes after the start of the co-feed solutions, ME I prepared previously was added to the kettle at a rate of 5 g/min. There was no external heat applied to the reaction. The temperature of the kettle was allowed to increase over the duration of the ME feed. After 40 minutes, the ME I feed rate was increased to 10 g/min. Upon completion of ME I the co-feeds were stopped and the reaction was held for 5 min. The temperature of the reaction at this point was 61° C. Next, 700 g of hot DI water (90° C.) was added to the kettle. A second monomer emulsion (ME II) was prepared by mixing 40.9 g of DI water, 2.3 g of SDS, 55.9 g of MMA, 79.0 g of BA and 2.0 g of 4-hydroxy TEMPO (4-hydroxy 2,2,6,6-tetramethyl piperidinyloxy radical), and was added to the kettle at a rate of 30 g/min until completion. Immediately after completion of the ME II feed, 41 g of ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 39.9%, and an average particle size of 325 nm.

Example 3

Preparation of Unswollen First Polymer

A first polymer was prepared in the manner and with the materials set forth in Example 1, except that 317.5 g of the polymer core was added to the heated kettle containing aqueous sodium persulfate and DI water. The final unneutralized latex had a solids content of 40.2%, an average particle size of 340 nm, and a pH of 2.2.

Example 4

Formation of Aqueous Dispersion of Hollow Core Binder Polymer

Using the same equipment as in Example 1, 1119.0 grams of the first polymer of Example 3 along with 50 g of DI water was added to the kettle and the temperature was adjusted to 25° C. A monomer emulsion (ME I) was prepared by mixing 229.1 g of DI water, 12.7 g of SDS, 313.1 g of MMA, 9.0 g of MAA, and 443.0 g of BA. With the kettle temperature at 25° C., a solution of 20.0 g of 0.1% ferrous sulfate mixed with 2 g of 1% tetrasodium ethylenediamine tetraacetate, available as Versene™ (Dow Corp.), was added to the kettle. Next, co-feeds including a solution of 2.8 g of t-BHP (70%) mixed with 80.0 g of DI water, along with a separate solution of 2.0 g of iso-ascorbic acid mixed with 80.0 g of DI water were both added to the kettle at a rate of 0.5 g/min. Two minutes after the start of the co-feed solutions, ME I prepared previously was added to the kettle at a rate of 5 g/min. There was no external heat applied to the reaction. The temperature of the kettle was allowed to increase over the duration of the ME feed. After 40 minutes, the ME I feed rate was increased to 10 g/min. Upon completion of ME I the co-feeds were stopped and the reaction was held for 5 min. The temperature of the reaction at this point was 68° C. Next, 700 g of hot DI water (90° C.) was added to the kettle. A second monomer emulsion (ME II) was prepared by mixing 40.9 g of DI water, 2.3 g of SDS, 55.9 g of MMA, 79.0 g of BA and 2.0 g of 4-hydroxy TEMPO (4-hydroxy 2,2,6,6-tetramethyl piperidinyloxy radical), and was added to the kettle at a rate of 30 g/min until completion. Immediately after completion of the ME II feed, 41 g of ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 38.4%, and an average particle size of 511 nm.

Example 5

Preparation of Unswollen First Polymer

A first polymer was prepared in the manner and with the materials set forth in Example 1, except that 311.5 g of the polymer core was added to the heated kettle containing aqueous sodium persulfate and DI water, and the second monomer emulsion (ME II) was prepared by mixing with the remaining ME II monomers 15.0 g of divinylbenzene instead of 12.0 g of allyl methacrylate. The final unneutralized latex had a solids content of 40.4%, an average particle size of 236 nm, and a pH of 2.1.

Example 6

Forming an Aqueous Dispersion of Hollow Core Binder Polymer

Using the same equipment as in Example 1, 1113.9 grams of the first polymer of Example 5 along with 50 g of DI water was added to the kettle and the temperature was adjusted to 28° C. A monomer emulsion (ME I) was prepared by mixing 229.1 g of DI water, 12.7 g of SDS, 256.6 g of MMA, 9.0 g of MAA, and 499.5 g of BA. With the kettle temperature at 28° C., a solution of 13.3 g of 0.15% ferrous sulfate mixed with 2 g of 1% tetrasodium ethylenediamine tetraacetate, available as Versene™ (Dow Corp.), was added to the kettle. Next, co-feeds including a solution of 2.8 g of t-BHP (70%) mixed with 80.0 g of DI water, along with a separate solution of 2.0 g of iso-ascorbic acid mixed with 80.0 g of DI water were both added to the kettle at a rate of 1.2 g/min. Two minutes after the start of the co-feed solutions, ME I prepared previously was added to the kettle at a rate of 5 g/min. There was no external heat applied to the reaction. The temperature of the kettle was allowed to increase over the duration of the ME feed. After 45 minutes, the ME I feed rate was increased to 10 g/min. Upon completion of ME I the co-feeds were stopped and the reaction was held for 5 min. The temperature of the reaction at this point was 69° C. Next, 625 g of hot DI water (90° C.) was added to the kettle. A second monomer emulsion (ME II) was prepared by mixing 40.9 g of DI water, 2.3 g of SDS, 45.8 g of MMA, 89.1 g of BA and 2.0 g of 4-hydroxy TEMPO (4-hydroxy 2,2,6,6-tetramethyl piperidinyloxy radical), and was added to the kettle at a rate of 30 g/min until completion. Immediately after completion of the ME II feed, 67.3 g of ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 40.6%, and an average particle size of 338 nm.

Example 7

Preparation of Unswollen First Polymer

A first polymer was prepared in the manner and with the materials set forth in Example 5. The final unneutralized latex had a solids content of 40.2%, an average particle size of 232 nm, and a pH of 2.1.

Example 8

Formation of Aqueous Dispersion of Hollow Core Binder Polymer

Using the same equipment as in Example 1, 1119.4 grams of the first polymer of Example 7 along with 40 g of DI water was added to the kettle and the temperature was adjusted to 26° C. A monomer emulsion (ME I) was prepared by mixing 229.1 g of DI water, 12.7 g of SDS, 375.8 g of MMA, 9.0 g of MAA, and 380.3 g of BA. With the kettle temperature at 26° C., a solution of 13.3 g of 0.15% ferrous sulfate mixed with 2 g of 1% tetrasodium ethylenediamine tetraacetate, available as Versene™ (Dow Corp.), was added to the kettle. Next, co-feeds including a solution of 2.8 g of t-BHP (70%) mixed with 80.0 g of DI water, along with a separate solution of 2.0 g of iso-ascorbic acid mixed with 80.0 g of DI water were both added to the kettle at a rate of 0.5 g/min. Two minutes after the start of the co-feed solutions, ME I prepared previously was added to the kettle at a rate of 5 g/min. There was no external heat applied to the reaction. The temperature of the kettle was allowed to increase over the duration of the ME feed. After 45 minutes, the ME I feed rate was increased to 10 g/min. Upon completion of ME I the co-feeds were stopped and the reaction was held for 5 min. The temperature of the reaction at this point was 72° C. Next, 625 g of hot DI water (90° C.) was added to the kettle. A second monomer emulsion (ME II) was prepared by mixing 40.9 g of DI water, 2.3 g of SDS, 67.0 g of MMA, 67.9 g of BA and 2.0 g of 4-hydroxy TEMPO (4-hydroxy 2,2,6,6-tetramethyl piperidinyloxy radical), and was added to the kettle at a rate of 30 g/min until completion. Immediately after completion of the ME II feed, 67.3 g of ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 40.5%, and an average particle size of 329 nm.

Example 9

Formation of Aqueous Dispersion of Hollow Core Binder Polymer

Using the same equipment as in Example 1, 1119.4 grams of the first polymer of Example 7 along with 50 g of DI water was added to the kettle and the temperature was adjusted to 24° C. A monomer emulsion (ME I) was prepared by mixing 229.1 g of DI water, 12.7 g of SDS, 313.1 g of MMA, 9.0 g of MAA, and 443.0 g of BA. With the kettle temperature at 24° C., a solution of 13.3 g of 0.15% ferrous sulfate mixed with 2 g of 1% tetrasodium ethylenediamine tetraacetate, available as Versene™ (Dow Corp.), was added to the kettle. Next, co-feeds including a solution of 2.8 g of t-BHP (70%) mixed with 80.0 g of DI water, along with a separate solution of 2.0 g of iso-ascorbic acid mixed with 80.0 g of DI water were both added to the kettle at a rate of 0.5 g/min. Two minutes after the start of the co-feed solutions, ME I prepared previously was added to the kettle at a rate of 5 g/min. There was no external heat applied to the reaction. The temperature of the kettle was allowed to increase over the duration of the ME feed. After 45 minutes, the ME I feed rate was increased to 10 g/min. Upon completion of ME I the co-feeds were stopped and the reaction was held for 5 min. The temperature of the reaction at this point was 69° C. Next, 625 g of hot DI water (90° C.) was added to the kettle. A second monomer emulsion (ME II) was prepared by mixing 40.9 g of DI water, 2.3 g of SDS, 55.9 g of MMA, 79.0 g of BA and 2.0 g of 4-hydroxy TEMPO (4-hydroxy 2,2,6,6-tetramethyl piperidinyloxy radical), and was added to the kettle at a rate of 30 g/min until completion. Immediately after completion of the ME II feed, 28.7 g of ammonium hydroxide (28%) was added to the kettle. The reaction was held for 5 min. The co-feed solutions were then resumed at a rate of 1.0 g/min until their completion. The dispersion was then cooled to 25° C. and filtered to remove any coagulum. The filtered dispersion had a solids content of 41.2%, and an average particle size of 332 nm.

Formulations of Polymers of Examples 2, 4 and Comparative Example

Coating formulations of the ingredients were mixed in a plastic 0.946 liter (1 quart) container in the manner set forth in Table 1, below.

As shown in Table 1, below, the 330 nm average particle size hollow core binder polymer of Example 2 provides similar opacity to a commercial fast dry polymer when formulated with 50% of the amount of titanium dioxide. The 511 nm average particle size hollow core binder polymer provides better opacity than the 330 nanometer particle size hollow core binder polymer; however, the high shear viscosity is much higher and the spray characteristics poor due to poorer atomization of the coating. In addition, the larger particle size the 511 nm average particle size hollow core binder polymer in Example 4 will form sediment much faster than the 330 nm average particle size hollow core binder polymer.

TABLE 1

| | EXAMPLE | | |
|---|---|---|---|
| | 2 | 4 | Comparative |
| Particle size by CHDF (nm) | 330 | 511 | — |
| COATING DESCRIPTION | | | |
| Polymer of Example 2 (39.9% solids by weight) | 479.1 | — | — |
| Polymer of Example 4 (38.4% solids by weight) | — | 490.3 | — |
| Poly(oxazolidinylethyl methacrylate) (prepared according to the procedure shown in EP0950763A; 26.5 wt. % solids) | 9.1 | 9.4 | — |
| MIX FOR 5 MINUTES, THEN ADD: | | | |
| [1]Fastrack ™ 3427 Anionically stabilized aqueous fast-dry acrylic copolymer binder (50.5 wt. % solids) | — | — | 455.5 |
| Acrylic dispersant (sodium salt of poly-methacrylic acid/acrylic acid copolymer; 35 wt. % aqueous solution) | 4.8 | 4.8 | — |
| Acrylic dispersant (ammonium salt of poly-methacrylic acid; 30 wt. % aqueous solution) | — | — | 5.0 |
| [2]Surfynol ™ CT-136 Proprietary acetylenic surfactant blend | 2.8 | 2.8 | 2.8 |
| [3]Drewplus ™ L-493 Mineral oil based foam control agent | 5.5 | 5.5 | 5.5 |
| Titanium dioxide pigment (rutile; made by chloride process; contains 0 to 4.5% Al(OH)$_3$) | 50.0 | 50.0 | 100.0 |
| Calcium carbonate (ground; mean part size 5.5 μm) | 792.5 | 793.2 | 760.6 |
| DISPERSE FOR 10 MINUTES, THEN ADD THE FOLLOWING WITH GOOD MIXING: | | | |
| Methanol | — | — | 30.0 |
| 2,2,4-trimethyl-1,3-pentanediol monoisobutyrate | 15.5 | 14.4 | 18.4 |
| Mix for 10 minutes, then thicken: | | | |
| 2-hydroxyethyl cellulose aqueous solution (2% solids by weight; Viscosity Type HR: A 1% aqueous solution has a viscosity of 1,500 to 2,500 cps) | 29.4 | 37.2 | 12.0 |
| Water | 0.0 | 0.0 | 17.6 |

TABLE 1-continued

|  | EXAMPLE | | |
| --- | --- | --- | --- |
|  | 2 | 4 | Comparative |
| FORMULATION PARAMETERS: | | | |
| % PIGMENT VOLUME CONTENT | 60.0 | 60.0 | 60.0 |
| % VOLUME SOLIDS | 61.0 | 61.0 | 61.0 |
| PAINT PROPERTIES | | | |
| HIDING (Contrast Ratio) | 0.943 | 0.960 | 0.945 |
| HIGH SHEAR VISCOSITY Cone and plate viscometer; poise) | 2.2 | 4.5 | 1.3 |
| AIR ASSISTED SPRAYABILITY | Good | Poor | Good |

[1] Rohm and Haas Company, Philadelphia, PA.
[2] Air Products and Chemicals, Inc., Allentown, PA.
[3] Ashland, Inc., Covington, KY.

Formulations of Polymers of Examples 6, 8 and 9

Coating formulations of the ingredients were mixed in a plastic 0.946 liter (1 quart) container in the manner set forth in Table 2, below.

TABLE 2

|  | EXAMPLE | | |
| --- | --- | --- | --- |
|  | 8 | 9 | 6 |
| Particle size by CHDF (nm) | 329 | 332 | 338 |
| Tg (° C.) (calculated) | 5.2 | −6.5 | −16.2 |
| COATING DESCRIPTION | | | |
| Polymer of Example 8 (40.5% solids by weight) | 436.9 | — | — |
| Polymer of Example 9 (41.2% solids by weight) | — | 437.7 | — |
| Polymer of Example 6 (40.6% solids by weight) | — | — | 438.8 |
| Poly(oxazolidinylethyl methacrylate) (prepared according to the procedure shown in EP0950763A; 26.5 wt. % solids) | 8.5 | 8.6 | 8.5 |
| MIX FOR 5 MINUTES, THEN ADD: | | | |
| Acrylic dispersant (sodium salt of poly-methacrylic acid/acrylic acid copolymer; 35 wt. % aqueous solution) | 5.1 | 5.1 | 5.1 |
| Surfynol ™ CT-136 Proprietary acetylenic surfactant blend | 2.8 | 2.8 | 2.8 |
| Drewplus ™ L-493 Mineral oil based foam control agent | 5.5 | 5.5 | 5.5 |
| Titanium dioxide pigment (rutile; made by chloride process; contains 0 to 4.5% Al(OH)$_3$) | 65.0 | 65.0 | 65.0 |
| Calcium carbonate (ground; mean part size 5.5 μm) | 749.7 | 749.5 | 749.6 |
| DISPERSE FOR 10 MINUTES, THEN ADD THE FOLLOWING WITH GOOD MIXING: | | | |
| Water | — | — | 23.5 |
| 2,2,4-trimethyl-1,3-pentanediol monoisobutyrate | 23.3 | 18.2 | 14.4 |
| Mix for 10 minutes, then thicken: | | | |
| 2-hydroxyethyl cellulose aqueous solution (2% solids by weight; Viscosity Type HR: A 1% aqueous solution has a viscosity of 1,500 to 2,500 cps) | 50.5 | 47.5 | 28.9 |
| Water | 24.9 | 25.8 | 29.4 |
| FORMULATION PARAMETERS: | | | |
| % PIGMENT VOLUME CONTENT | 60.0 | 60.0 | 60.0 |
| % VOLUME SOLIDS | 58.5 | 58.5 | 58.5 |
| PAINT PROPERTIES | | | |
| HIDING (Contrast Ratio) | 0.954 | 0.956 | 0.949 |
| ABRASIVE SCRUB RESISTANCE (cycles to failure) | 1190 | 868 | 528 |
| FLEXIBILITY (angle to crack over 0.32 mm Mandrel) | 55° | 109° | 97° |

The softer encapsulating second polymer of the Example 9 hollow core binder provides better paint film flexibility than the harder encapsulating second polymer of Example 8; however, the abrasive scrub resistance is worse. Example 6 illustrates that further increasing the softness of the encapsulating second polymer further reduces abrasive scrub resistance with no improvement in flexibility.

We claim:

1. A fast-drying aqueous composition comprising one or more hollow core binder of a first polymer having a glass transition temperature (Tg) of 50° C. or more and containing one or more void, the said first polymer being substantially encapsulated by one or more second polymer having a Tg of −30° C. or more, the said hollow core binder having an average particle size of from 200 to 500 nanometers (nm), and the said fast-drying aqueous composition being in one component or two components, wherein, the said two component composition further comprises an absorber component, and, further wherein, the said one component composition further comprises a volatile base in an amount sufficient to raise the pH of the said fast-drying aqueous composition to 7.5 or more, and the said second polymer of the said one component composition is chosen from an anionically stabilized emulsion polymer, a polyamine functional emulsion polymer containing pendant amine functionality, a hydrophobic polyamine functional emulsion polymer, a blend of an emulsion polymer having pendant strong cationic groups and an emulsion polymer having pendant weak acid groups, and mixtures thereof, still further, wherein, when the second polymer of the hollow core binder is an anionically stabilized emulsion polymer, the composition further comprises polyfunctional amine.

2. The composition as claimed in claim 1, wherein the average particle size of the said hollow core binder is 300 nm or more.

3. The composition as claimed in claim 2, wherein the average particle size of the said hollow core binder is 320 nm or more.

4. The composition as claimed in claim 1, wherein the average particle size of the said hollow core binder is 470 nm or less.

5. The composition as claimed in claim 1, wherein the said first polymer and the second polymer of the said hollow core binder are formed from, as polymerized units, one or more mono-ethylenically unsaturated monomer.

6. The composition as claimed in claim 5, wherein the said first polymer of the said hollow core binder is a multi-stage copolymer.

7. The composition as claimed in claim 1, wherein the glass transition temperature (Tg) of the said second polymer of the said hollow core binder ranges from −20° C. to 60° C.

8. A method of making a roadway marking comprising applying the said fast-drying aqueous composition of claim 1 to a road.

9. A coating on a substrate made from the fast-drying aqueous compositions as claimed in claim 1.

10. The coating as claimed in claim 8, which is a roadway marking.

* * * * *